March 6, 1962  S. M. BLOCK  3,024,413
SEQUENTIAL ELECTRONIC MOTION TIMER AND RECORDER
Filed Aug. 17, 1959
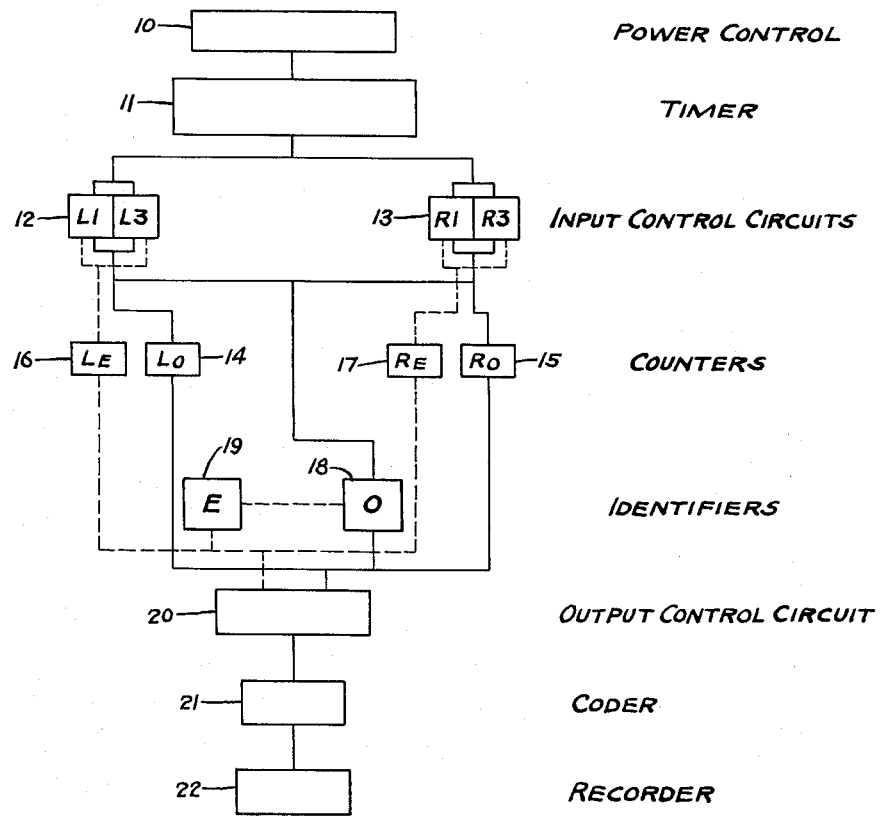
INVENTOR.
STANLEY M. BLOCK
BY
*Moore, White & Burd*
ATTORNEYS

United States Patent Office

3,024,413
Patented Mar. 6, 1962

3,024,413
SEQUENTIAL ELECTRONIC MOTION TIMER
AND RECORDER
Stanley M. Block, Minneapolis, Minn., assignor to The
Regents of the University of Minnesota, Minneapolis,
Minn., a corporation of Minnesota
Filed Aug. 17, 1959, Ser. No. 834,103
10 Claims. (Cl. 324—68)

This invention relates to an automatic digital recorder for motion-study research and similar applications. More particularly, this invention relates to apparatus for the collection of elemental time data for manual or machine motion-study or for recording the occurrence and time duration of specified events or conditions in industrial, engineering, psychological, medical and other types of research. It is an electronic device which accurately and automatically times and identifies a very long series of relatively short time intervals (from a fraction of a second to many minutes) and records these data in a form which can be read, translated and/or computed by commercially available equipment.

In a variety of fields, it is desirable to have at hand information relating activities to time. A familiar example of this is a time study to determine how long it should take to perform a given task involving a given set of motions and reactions which are performed over and over again. Such time motion studies are useful industrially, as in the labor-management field, to determine bases for production norms, for incentive pay raises, for determining optimum rate of movement of assembly lines and the like. Such studies are useful both to labor leaders and to management officials in providing impartial factual data.

Existing equipment and techniques are subject to a number of drawbacks. Where the study is based on human observation, the possibility of human error is present. Where the subject under study is conscious of observation, this fact is often revealed in abnormal reactions. In conducting motion study research existing equipment makes it necessary to sum individual time values for an elemental motion on an accumulating clock or to get individual values by laborious analysis of micromotion film or kymograph tape. In order to draw statistically valid conclusions, a researcher must accumulate and analyze large samples of data to distinguish variations caused by variables under investigation from those caused by differences in skill, practice, effort, chance, etc.

The principal object of this invention is to provide a system for automatically identifying and recording time intervals associated with events of significance to the researcher.

It is an object of this invention to provide apparatus which will automatically record time interval data in a medium which can serve as input to commercially available translating and computing equipment.

It is another object of this invention to provide equipment for the accurate recording and identification of sequential relatively short time intervals in machine language.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

For illustrative purposes, this invention will be described in connection with an extremely simple series of hand motions representative of those which might be encountered in an industrial time study. It is to be understood that these exemplary motions are illustrative only and that available components and knowledge make possible the study of vastly more complicated motions and other significant events and conditions. The device of this invention assumes that the beginning or ending points of motions or reactions to be measured and studied can be marked by an electrical signal through the use of components, such as microswitches, photoelectric cells, contact relays, etc.

As an example, one may visualize the motions involved by a subject whose assigned task requires him to repeatedly select an object, such as a peg or plug, from a supply of the same and insert it in an opening. Analyzing this extremely simple, but repetitive, work cycle one will see that it involves four elements. These are:

(I) Grasp, when he grasps and picks up one peg from the supply;

(II) Move, when he moves the grasped peg to the area of the opening or hole;

(III) Insert, when he places the peg in the opening and releases it; and (IV) Reach, when the hand of the subject returns to the area of the supply of pegs.

Thereafter, the cycle is repeated over and over. The work cycle may involve the use of one or both hands and the time data for either or both hands may be collected and recorded according to the present system.

Means for signalling the beginning and end of each work cycle element must be provided according to the nature of the study. In the example given, where the work pieces are metal, a bridge circuit may be utilized which is sensitive to body contact with metal. Thus, when the subject grasps a metal peg in a metal container of similar metal pegs, the completion of a circuit due to body contact with metal may be utilized to close a first electronic relay. After he has grasped a peg and lifts it from the supply container, the circuit is broken and the first relay is opened. The time interval during which the hand of the subject is in contact with the metal peg in the supply container may be characterized as an "odd" event and measured on a suitable counting device activated through the period of current flow.

During the interval of moving the peg to the hole, the first relay is open. When the peg is inserted in a hole, also in metal, contact is again made to close a second relay. During the interval between the opening of the first relay and the closing of the second relay no current flows through the circuit of which the subject's body is a part. This interval may be measured by directing pulses from a suitable timing unit to a second counting device and may be characterized as an "even" event following sequentially the preceding "odd" event.

The interval during which the subject's hand holding the peg is in contact with the hole or opening into which the peg is being inserted is characterized by closing a second relay operated by the flow of current through a circuit of which the subject's body is a part. When the subject loosens his grasp on the peg, the circuit is again broken and the second relay is opened. The interval of this current flow can be measured on the counting device and may be characterized as the second "odd" event.

The interval during which the subject is reaching for the next peg is characterized by absence of current flow through the circuit of which his body is a part. This time interval is measured by a counting device and may be characterized as the second "even" sequential event. Then when he grasps the next peg, the first relay is again closed and the cycle is repeated.

It will be seen that for the time periods of (I) Grasp, relay No. 1 is closed; (II) Move, both relays are open; (III) Insert, relay No. 2 is closed; and (IV) Reach, both relays are again opened. Thus, each of the elements of the simple work cycle is sharply defined as to time. Each of the "odd" elements or events is characterized by the flow of current of which the subject's body is a part and is sharply defined by the opening and later closing of a relay or like switch or similar means. Each of the sequential "even" elements or events is characterized by the absence of flow of current through the circuit of which the subject's body is a part and is sharply defined by the opening of the switch of the last preceding "odd" event and by the closing of the switch of the next sequential "odd" event. In other words, the "odd" events may be characterized as "on" periods while the "even" events may be characterized as "off" periods.

As a timing unit, the system of one exemplary form of this invention utilizes an oscillator. Such an oscillator may be set at a convenient time interval, such as 100, 500 or 1000 cycles per second depending upon the desired time span and desired accuracy. For each series of sequential motions to be timed, there is provided a pair of electronic counters. The time intervals of the work cycle elements are determined by counting oscillator pulses on digit counters using decade counting tubes. The counters are used in pairs so that each measures the time intervals of alternating work cycle elements. While one counter is counting pulses, the other is reporting the elapsed time of the last previous work cycle element and made ready for the next work cycle element. This use of alternating counters allows the time on the stopped counter to be recorded and the counter reset to zero preparatory to counting the time interval of the next work cycle element.

In the exemplary work cycle the relays function as electronic switches to actuate the counter tubes. During the time interval of work cycle element (I) Grasp, while relay No. 1 is closed, the first counter tube is counting the oscillator pulses to measure the length of the time interval. When the first relay is opened signaling the beginning of the work cycle element (II) Move, the first counter tube is blocked and stops counting and the second counter tube begins to count. During the interval that the second counter is counting the length of the Move interval, the time data already accumulated on the blocked first counter is read out, coded and recorded and the counter is reset to zero to be ready to time the next sequential event.

Thus, when the end of work cycle (II) Move is ended and element (III) Insert is begun as signaled by the closing of the second relay, the second counter tube is blocked and stops counting and the first counter tube, having been cleared, is ready to begin counting the time interval of the third work cycle element. During this interval, the time from the blocked second counter is read out, coded and recorded and the counter is cleared to be ready to count the pulses during the time interval of work cycle element (IV) Reach. Thus, the counters alternate, with one counting while the accumulated data from the second is read out, coded and recorded, and the second counting while the accumulated data from the first is read out, coded and recorded.

Where two simultaneous series of events are being timed, two pairs of counters are utilized, the second pair functioning in the same manner as the first. The oscillator pulses are directed into the proper counter by the relays which act as switches and are activated by signals from the work cycle under observation. The accumulated time value on the one counter of each pair not in use counting is "read out" and coded onto a medium, such as punched tape, punched cards, magnetic tape or the like, which can serve as input to a variety of commercially available translating and computing equipment. When the accumulated time value on a counter has been coded and read out, that counter is reset to zero in order to be ready to time the next event.

In order to make the coded time values meaningful, it is necessary to provide at the same time an identification unit which automatically provides a coded electrical signal which identifies the particular event for which the time is indicated.

The minimum time interval which can be recorded is dependent upon the read-out time, which in turn is limited by the speed of the recording medium. For example, when the coded data is recorded on punched tape using a high speed paper tape punch capable of punching sixty characters per second, three digits of coded time data and two digits of coded identification can be recorded in less than $1/10$ of a second. Where longer time intervals are being measured, greater amounts of information may be recorded. Where two hands are being used in nearly identical motion patterns to accomplish a repetitive work cycle, the element time values for both may be combined in a single recording, using the common identification code. Shorter sequential events can be timed and recorded by using a faster recording means, such as magnetic tape, by using buffer storage, or by using more counter units and/or more recording units.

The recorded data may be translated into typewritten forms by automatic tape controlled typewriters (such as the Friden-Flexowriter). The coded data can readily be converted by available tape controlled card punches into punched card form for sorting, frequency distribution analysis, listing, or computation on commercial equipment (such as IBM or Remington Rand). The coded data on tape can also be used as direct input to certain high speed electronic computers (such as Univac Scientific) for more elaborate statistical analysis. The data may be utilized for translation or computation purposes without need for interpretation or modification by a human operator and without the inherent delay and error possibilities.

Utilizing commercially available component units and parts, timer and recorder means may be assembled according to this invention having all of the following important characteristics:

(A) The necessity of an observer is eliminated along with inherent human reaction time and possibility of error. Observer errors and reaction time are excluded by the automatic recording of motion time.

(B) Positive and consistent boundary lines are provided between successive events.

(C) As high a degree of accuracy as desired or required in timing each individual event is provided. Measurements of short time intervals may be made to an accuracy of 0.001 or 0.0001 second or even shorter time intervals depending upon the frequency of the timing unit.

(D) A very large series of sequential (successive) events may be timed.

(E) Time values of elements of work cycles or other events are positively and automatically identified.

(F) Identification and time data are recorded in a form which can be readily read, translated, and/or computed by commercially available equipment without the effort and possible error of human translation. Read-out and coding of elapsed time is provided on punched tape, magnetic tape, punched cards or other machine language media.

(G) An indefinite long series of related events which are occurring simultaneously with the first series of events may be independently timed and recorded. For example, two related events, such as symmetrical two-handed motions, are timed, identified and recorded simultaneously.

(H) Time values may be clocked from zero eliminating the need for subtracting successive values.

(I) Manual (visual) read-out of electronic counters is permitted.

The essential components of the timer and recorder device of this invention include:

(1) A regulated source of electrical power;

(2) A timing unit or master clock such as an electronic oscillator or tuning fork which provides an infinite series of electrical pulses at a stable and known frequency;

(3) Two or more electronic counters (decade, binary, octal or similar type) which can be rapidly reset to zero as desired and which measure time intervals by counting the number of electrical pulses directed to their inputs;

(4) Input control circuits (consisting of transducers, gates, flip-flops, etc.) which sense the beginning or ending points of events to be timed and which switch the timing unit or master clock pulses from one digital counter to the next counter;

(5) Two or more identification units which identify (by code number or signal) the event which is being timed and retain that identification code until the event has been completed and the identification code has been recorded with the corresponding elapsed time value for the event;

(6) One or more recording devices such as a paper tape punch, a magnetic tape recorder or a tabulating card punch which can rapidly and accurately record the identification and elapsed time data for each event in a form which can be automatically read, translated and/or computed by commercially available equipment;

(7) Coders (and amplifiers, if needed to strengthen the electrical signals of the counters and identification units) to translate the signals into the form necessary for input to the chosen recording device in standard code form; and (8) Output control circuits (consisting of stepping switches, gates, flip-flops, reset circuits, etc.) which connect at the proper time and in the proper sequence the counters and identification units with the chosen amplifiers, coders and recorders.

The invention is illustrated by the single FIGURE which is a functional schematic diagram of one form of the timer and recording device according to this invention showing in simplified form the relationships among the several components making up the device.

Referring to the drawing, the timer and recorder system includes a power control unit 10 for supplying regulated electrical power from a power source. An exemplary power supply unit is the Lambda C-281, manufactured and sold by Lambda Electronics Corp., College Point, New York. This unit has a voltage range of from 125 to 325 v. D.C. and a current range from 0 to 200 milliamps. Any power supply unit may be utilized which is capable of providing regulated electrical power within the required voltage and current ranges.

As a timing unit 11 or master clock, the system may include any device which will provide an infinite series of electrical pulses at a stable and known frequency. The required frequency depends to large extent upon the length of the time intervals to be measured and the desired degree of accuracy. Relatively lower frequencies may be utilized to measure relatively longer time intervals and relatively higher frequencies are required for relatively shorter time intervals. Suitable timing units include electronic oscillators, tuning forks, higher frequency crystal controlled oscillators combined with frequency reducer circuits which divide the frequency by powers of 2, 10, 100, 1000, etc. in order to achieve the desired master clock frequency, and like pulse generators.

An exemplary master clock timing unit is the Hewlett-Packard Wien bridge resistor-capacitor oscillator which is adjustable to generate pulses at 100, 500 or 1000 cycles per second.

Flow of the pulsating current generated by the timing unit is regulated by input control circuits 12 and 13, shown schematically. The exemplary device illustrated is adapted to simultaneous two-hand motion study. The left hand input control circuits are indicated generally at 12 with the right hand input control circuits being indicated generally at 13. In the exemplary Grasp-Move-Insert-Reach four-element work cycle described, it is necessary that there be only two input stations for each hand designated as L–1, L–3, R–1 and R–3 since the "even" events in the cycle are represented by "off" periods of current flow in the input control circuits. Where a more complex work cycle is being timed, as many inputs are provided for each hand as may be required. For example, in a simultaneous two-hand work cycle including twelve elements, six "odd" input circuits would be provided for each hand; for an eighteen element work cycle, nine input circuits would be provided, etc.

The input control circuits consist of transducers, gates, flip-flops, etc. which detect the beginning and ending points of the events to be timed and control the direction of pulses from the timing unit to one digital counter or to the next. Depending upon the nature of the events or motions being timed, the transducer may be a bridge circuit sensitive to body contact with metal, as in the exemplary work cycle; photoelectric cell; "Microswitches"; machine controls; proximity relays; microphones, where audible events are timed; or any other means capable of changing an electrical circuit in response to a motion or reaction. It will be seen that the selection of the particular transducers or combination of transducers is largely dependent upon the particular sequence of motions or events or sounds or reactions, etc. undergoing measurement and study. The selection of the particular transducer element is within the skill of the art guided by the environment in which it is to be used.

As previously noted, a transducer circuit is used for each alternate element of the work cycle under study. In the present context, alternate "odd" elements of the work cycle are "on" periods while the "even" elements are "off" phases of the cycle. Where the transducer element includes a switch, the beginning and ending of the work cycle element is marked by making and breaking contact by the switch. In other situations, electrical, electromagnetic or electronic switches, such as relays, flip-flops, and the like, are used to provide an electrical signal which provides the delineation between work cycle elements.

A counter 14 is provided to count left hand "odd" work cycle elements. A counter 15 is provided to count right hand "odd" work cycle elements. A separate counter 16 is provided to count left hand "even" work cycle elements and a similar counter 17 is provided to count right hand "even" work cycle elements. Depending upon the time span of the intervals being measured, the counter unit may be any of a number of commercially available mechanical and electronic counters. These may be of the type employing rotating hands or rotating wheels, etc., but preferably, electronic counter tubes or binary scalers are used where short time intervals are desired to be measured with high accuracy.

An exemplary counter unit is the Dynapar Type 43S sold by Dynapar Corp. of Skokie, Illinois. These digital counter units each include three decade counting tubes for counting pulses in units, 10's, and 100's and thus are capable of counting from 1 to 999 pulses. When used in conjunction with a 100 c.p.s. timing unit, such a counter can measure events from 0.01 second to 9.99 seconds. Where two counter units (each having three tubes) are coupled together to count pulses from a 1000 c.p.s. timing unit, up to 999,999 pulses may be counted covering a time span from 0.001 second to 16⅔ minutes. These counters are adapted to be reset to zero either manually or by signal from the output control circuit indicating that the accumulated time data has been read out of the counter. Separate counters are necessary to time the "odd" and "even" elements of the work cycle. As the "even" counters 16 and 17 are accumulating time data with respect to "even" elements of a work cycle, the "odd" counters 14 and 15 are being read out and reset to zero. From the input control circuits the timing and recording circuits are shown alternately by the broken and unbroken lines. Although the counters are described as being in pairs, sets of counters of three or more may be used where the events being timed make the use of only two counters undesirable or impracticable.

In order that the accumulated time data read out from each of the counters may have some meaning so that they may be evaluated, it is necessary that the time data be identified with the work cycle elements with which they are associated. This is done by means of an identifying unit 18 for designating the sequence of "odd" events and an identifying unit 19 for designating the "even" events by reference to the "odd" events with which they are in sequence. The identifying means used in the exemplary system is an electronic tube (Sylvania 6476) which is set to the appropriate code number by the input control circuit from which the signal is received. The "odd" identifier identifies each "odd" work cycle element in alternating sequence. The "even" identifier identifies the intervening "even" work cycle element by reference to the preceding "odd" element.

The output from the counters and identifiers for the alternate "odd" and "even" events being timed is regulated through an output control circuit 20 consisting of stepping switches, gates, flip-flops, reset amplifiers and circuits, etc. which connect at the proper time and in the proper sequence the counters and identifiers with the chosen amplifiers, coders and recorders. The stepping switches in this exemplary model are electronic tubes (Sylvania 6476) the switch means of which move sequentially to permit the reading out of the identification symbol, left hand time values and right hand time values for any given work cycle element, followed by a "stop" symbol designating the end of that event. The data may be read out in any desired sequence, the foregoing being exemplary.

When the accumulated time and identification data has been read out for any particular event, the stepping tube signals this event to reset the counter to zero in readiness for counting the next sequential event. In the event the next sequential work cycle element is of extremely short duration, less than the read-out time of the last preceding event, the stepping tube acts to block the counters from receiving additional data until they have been readied for it by resetting to zero.

The signals representative of the accumulated identification and time values are directed to a coder 21 consisting of standard computer components for scanning and translating the signals into form for input to the chosen recording device in standard code form. The translated signal is directed to a recorder unit 22. Suitable recording devices include paper tape punches, magnetic tape recorders, tabulating card punches and the like which can accurately and rapidly record the identification and elapsed time data for each event in a form which can be automatically read, translated and/or computed by commercially available equipment. Exemplary of the recording component which may be used is the high speed tape punch consisting of a reperforator and motor unit sold by the Teletype Corp., subsidiary of Western Electric Company, Chicago, Illinois, which is the subject of Patent No. 2,675,078.

This high speed punch is provided with a plurality of punching elements, electromagnetically controlled and activated by signals from the coder unit. It is capable of punching characters in paper tape at the rate of 60 characters per second. It is adapted to punching characters in paper tape of varying width and number of channels depending upon the input requirements of the computing or tabulating devices into which the tape is to be fed. Some commercially available computing units take so-called five-channel tape while others require seven-channel tape.

The time required by the recording unit to physically record the accumulated data may be one limiting factor on the length of event which can be timed. For example, using the exemplary high speed tape punch four characters plus a stop symbol or space between events can be punched in less than one-tenth of a second. Eight characters plus a stop symbol or space between events can be punched in less than one-sixth second. Where the event being timed is of shorter duration, more rapid recording means, such as magnetic tape recorders, may be used.

Either hand may be independently timed and independently recorded or the element time values for two hands may be combined in a single recording. As an example, for one-hand motion with five digit read-out, three digits of time information and two digits of identification may be recorded. For eight digit read-out, six digits of time information plus two digits of identifying symbols or digits may be recorded. This latter is used where two counter units are used together for longer time spans or for increased accuracy. With eight digit read-out, three digits of time information for each of two hands may be combined in a single recording along with two digits of identification. It will be seen that the choice of recording equipment is dictated both by the length in time of the event being measured and by the input requirements of the apparatus into which the recorded data is to be fed for analysis and computation.

The recording and timing device of this invention is adapted to detecting and recording when or how often certain events occur or how long a certain situation continues. Reaction times to various stimuli may be measured. It may be used to measure the length of time that certain temperatures, pressures, forces, humidity conditions, potentials, etc. exceed or are less than specified values. Once the appropriate transducers or similar input circuits are assembled and connected to the recorder, data recording is continuous day and night without an observer. When the data has been collected, it can be fed into any of a number of commercially available devices for computation and analysis at great savings of time, energy and expense. The timer and recorder has application in the fields of psychology, biology, medicine and engineering. Psychologists can readily measure reaction times of humans or animals to certain stimuli under certain conditions by selection and connection of appropriate transducers between the experimental conditions or subjects and the timer and recorder.

It is apparent that many modifications and variations of this invention as hereinbefore set forth may be made without departing from the spirit and scope thereof. The specific embodiments described are given by way of example only and the invention is limited only by the terms of the appended claims.

I claim:

1. An apparatus for timing and recording sequential events which comprises timing means to generate a pulsating electrical signal at a predetermined frequency, at least one set of at least two counters for alternately counting timing pulses, at least two identifiers for identifying the events timed by the alternately timing counters, a plurality of contacts responsive to the sequential events under observation, electronic gating means responsive to operation of said contacts for alternately connecting the timing means to one counter of each set of said counters and for setting one of said identifiers to the proper code position while blocking the pulses alternately from all other counters of each set of said counters, read-out means for simultaneously alternately reading out, coding and recording accumulated data from a blocked counter of each of said sets of counters and the corresponding identifier, and a controller to sequence operation of the read-out means and reset the counters, after they have been read, for reuse to time a later sequential event.

2. An apparatus according to claim 1 further characterized in that said timing means generates pulses at a predetermined frequency between 100 and 10,000 cycles per second.

3. An apparatus according to claim 1 further characterized in that said timing means is an oscillator.

4. An apparatus according to claim 1 further characterized in that each of said counters includes at least three electronic decade counting tubes.

5. An apparatus according to claim 1 further characterized in that each of said identifiers includes an electronic decade tube.

6. An apparatus according to claim 1 further characterized in that each of said contacts responsive to the sequential events under observation is part of a transducer circuit.

7. An apparatus according to claim 1 further characterized in that said read-out means includes an electronic switch and a scanner to connect the elements of the counter and identifier to a coder and recorder in predetermined sequence, a coder to translate the pulses into meaningful form, and recording means to reproduce the coded values in functional physical form.

8. An apparatus according to claim 7 further characterized in that said recording means is a high speed punch.

9. An apparatus for timing and recording sequential events which comprises oscillator timing means to generate a pulsating electrical signal at a predetermined frequency between about 100 to 10,000 cycles per second, at least one set of at least two counters for alternately counting timing pulses, each of said counters including at least three electronic decade counter tubes, at least two identifiers for identifying the events timed by the alternately timing counters, each of said identifiers including an electronic decade tube, a plurality of contacts responsive to the sequential events under observation, each of said contacts being part of a transducer circuit, electronic gating means responsive to operation of said contacts for alternately connecting the timing means to one counter of each set of said counters and for setting one of said identifiers to the proper code position while blocking the pulses alternately from all other counters of each set of said counters, read-out means for simultaneously alternately reading out, coding and recording accumulated data from a blocked counter of each of said sets of counters and the corresponding identifier, said read-out means including an electronic switch and a scanner to connect the elements of the counters and identifiers to a coder and recording means in predetermined sequence, a coder to translate the pulses into meaningful form and high speed recording means to reproduce the coded values in functional physical form, and a controller to sequence operation of the read-out means and reset the counters, after they have been read, for reuse to time a later sequential event.

10. An apparatus for timing and recording sequential events which comprises means to generate a pulsating electrical signal at a predetermined frequency, counters for alternately counting timing pulses, identifiers for identifying the events timed by the alternately timing counters, a plurality of contacts responsive to the sequential events under observation, electronic gating means responsive to operation of said contacts for alternately connecting the timing means to one counter and for setting one identifier to the proper code position while blocking the pulses alternately from other counters, read-out means for simultaneously alternately reading out, coding and recording accumulated data from the blocked counters and the corresponding identifiers, and a controller to sequence operation of the read-out means and reset the counters, after they have been read, for reuse to time the next sequential event.

References Cited in the file of this patent

UNITED STATES PATENTS

| | | |
|---|---|---|
| 2,566,078 | Bliss | Aug. 28, 1951 |
| 2,740,091 | Goulding | Mar. 27, 1956 |
| 2,844,668 | West | July 22, 1958 |